(12) United States Patent
Takahashi

(10) Patent No.: US 6,470,794 B2
(45) Date of Patent: Oct. 29, 2002

(54) FRYER

(75) Inventor: Akito Takahashi, Nagoya (JP)

(73) Assignee: Paloma Industries, Limited, Aichi (JP)

( * ) Notice: Subject to any disclaimer, the term of this patent is extended or adjusted under 35 U.S.C. 154(b) by 0 days.

(21) Appl. No.: 10/003,945

(22) Filed: Oct. 23, 2001

(65) Prior Publication Data

US 2002/0046657 A1 Apr. 25, 2002

(30) Foreign Application Priority Data

Oct. 24, 2000 (JP) ........................................ 2000-323542

(51) Int. Cl.[7] .............. A47J 37/12; F24H 1/10; B01D 37/00
(52) U.S. Cl. .............. 99/408; 99/330; 99/403; 126/351.1; 126/391.1; 210/167; 210/DIG. 8
(58) Field of Search .................... 99/330, 331, 337, 99/338, 403–410, 417; 126/391.1, 390.1, 351.1, 350.1; 431/1, 6, 20, 30, 29, 31; 210/167, DIG. 8, 791, 805, 196, 411, 416.1, 424, 428

(56) References Cited

U.S. PATENT DOCUMENTS

| | | | |
|---|---|---|---|
| 4,768,426 A | 9/1988 | Nett | 99/408 |
| 4,890,548 A | 1/1990 | Grob et al. | 99/408 |
| 4,899,649 A | 2/1990 | Grob et al. | 99/408 |
| 4,974,501 A | 12/1990 | Grob et al. | 99/408 |
| 5,038,753 A * | 8/1991 | Yokoyama et al. | 99/403 X |
| 5,249,511 A | 10/1993 | Shumate et al. | 99/408 |
| 5,261,322 A * | 11/1993 | Yokoyama et al. | 99/330 |
| 5,297,474 A | 3/1994 | Tabuchi | 99/344 |
| 5,819,638 A * | 10/1998 | Yokoyama | 99/330 |
| 6,235,210 B1 * | 5/2001 | Saksena | 210/167 X |
| 6,269,808 B1 * | 8/2001 | Murahashi | 126/391.1 |
| 6,345,571 B2 * | 2/2002 | Tateyama | 99/330 |

* cited by examiner

Primary Examiner—Timothy F. Simone
(74) Attorney, Agent, or Firm—Pearson & Pearson, LLP

(57) ABSTRACT

The invention provides a fryer wherein the tasks of supplying and disposing oil are both simple and safe. An oil supply pipe (41) branches off from an oil pipe (34) between an oil tank (31) and an oil pump (33) of a fryer (1), and an oil supply valve (42) is provided at that connection portion for switching the intake route of the oil pump (33) between the oil tank (31) and the oil supply pipe (41). An oil disposal pipe (44) branches off from the oil pipe (34) between the oil pump (33) and an oil vat (11), and an oil disposal valve (45) is provided at that connection portion for switching the outflow route of the oil pump (33) between the oil vat (11) and the oil disposal pipe (44). Then, the valves are operated with an oil supply valve lever (43) and an oil disposal valve lever (46), and driving the oil pump (33), the tasks of supplying and discarding oil are carried out automatically.

3 Claims, 4 Drawing Sheets

FRYER

BACKGROUND OF THE INVENTION

1. Field of the Invention

The present invention relates to a fryer for the heating and cooking of foodstuffs with cooking oil filled into an oil vat.

2. Description of Related Art

In the food restaurant industry, for example in fast food restaurants, industrial fryers used in the preparation of deep-fried foods, such as the one shown in FIG. 5, are well known. In this fryer 1, the temperature of the oil filled into an oil vat 11 is maintained within a predetermined temperature range by heating control, and foodstuffs, such as potatoes for French fries, are put into the high temperature oil vat 11 and cooked.

As the oil degrades if it is continually used, it is necessary to C) periodically filter the oil with an oil cleaner 30. To filter the oil in the oil vat 11, a discharge valve lever 16 is operated to open a discharge valve 15, and the oil is transported into an oil tank 31. After the discharge valve 15 has been shut, an oil delivery valve lever 19 is operated to open an oil delivery valve 18, and oil that has passed through an oil filter 32 is returned to the oil vat 11 by driving an oil pump 33. However, because there is a limit to the filtering, oil that has exceeded a certain standard for the extent of oil degradation must be discarded. Naturally, after the oil has been discarded, new oil must be supplied.

Moreover, since oil is depleted because of absorption by the foods and evaporation through heating, it is necessary to periodically furnish oil to the oil vat 11, while the fryer 1 is in use.

Conventionally, the task of supplying oil involved putting the oil into a container, for example an industrial-size oil can, carrying the oil to the place where the fryer 1 was located, and then directly pouring the oil in the oil vat 11 from above. Also, the task of disposing of the oil involved attaching an oil discharge adapter (not shown in the drawings) to an oil discharge opening 14, so that the oil discharge adapter extended to the outside of the fryer 1, placing an empty can below the oil discharge adapter, discharging the oil, and then carrying away that can.

The oil supply task, however, required that the person performing that task to go through the trouble of carrying the oil to the fryer and then lifting the oil above the oil vat, thus making it a time-consuming task. Additionally, oil used for fryers is generally a solid oil at room temperature, for example shortening, thus making it necessary to first liquefy the oil before furnishing it into the empty oil vat. Thus, supplying oil that has been liquefied at a high temperature can be dangerous. Further, the task of discarding the oil is also a time consuming process as it requires man-power to carry the oil out of the fryer, and because the discarded oil is of a particularly elevated temperature, this work is dangerous as well. Moreover, when oil is added into the fryer while the fryer is in use, it is supplied into the fryer in a solid state without being liquefied, and there is the danger that high temperature oil in the oil vat would splash about and cause burns.

It is an object of the present invention to provide a fryer that solves the above problems, and in which the supply and discharge of oil is simple and safe.

SUMMARY OF THE INVENTION

To achieve the abovementioned object, a fryer in accordance with a first aspect of the present invention includes an oil vat for containing cooking oil; a heating means for heating the cooking oil in the oil vat; a filtering device for filtering the cooking oil in the oil vat when it is discharged into an oil tank; a return pipe serving as a duct for returning cooking oil in the filtering device to the oil vat; and an oil pump, disposed at an intermediate portion in the return pipe, for intaking cooking oil in the oil tank and pumping it to the oil vat, wherein, on the intake side of the oil pump, an oil supply pipe branches off from the return pipe, and an intake route switching means is provided for switching an intake route of the oil pump between the filtering device and the oil supply pipe.

A fryer in accordance with a second aspect of the present invention includes an oil vat for containing cooking oil; a heating means for heating the cooking oil in the oil vat; a filtering device for filtering the cooking oil in the oil vat when it is discharged into an oil tank; a return pipe serving as a duct for returning cooking oil in the filtering device to the oil vat; and an oil pump, disposed at an intermediate portion in the return pipe, for intaking cooking oil in the oil tank and pumping it to the oil vat, wherein, on the outflow side of the oil pump, an oil disposal pipe branches off from the return pipe, and an outflow route switching means is provided for switching the outflow route of the oil pump between the oil vat and the oil disposal pipe.

A fryer in accordance with a third aspect of the present invention includes an oil vat for containing cooking oil; a heating means for heating the cooking oil in the oil vat; a filtering device for filtering the cooking oil in the oil vat when it is discharged into an oil tank; a return pipe serving as a duct for returning cooking oil in the filtering device to the oil vat; and an oil pump, disposed at an intermediate portion in the return pipe, for intaking cooking oil in the oil tank and pumping it to the oil vat, wherein, on the intake side of the oil pump, an oil supply pipe branches off from the return pipe, and on the outflow side of the oil pump, an oil disposal pipe branches off from the return pipe; and wherein the fryer further comprises an intake route switching means for switching the intake route of the oil pump between the filtering device and the oil supply pipe, and an outflow route switching means for switching the outflow route of the oil pump between the oil vat and the oil disposal pipe.

In a fryer according to a first aspect of the present invention with the above configuration, the intake route switching means is used to switch the intake route of the oil pump provided for filtering oil from the oil tank to the oil supply pipes. By driving the oil pump, new oil for cooking is sucked in from the oil supply pipe and delivered to the oil vat by way of the return pipe, which is provided to serve as a filter return duct. Thus, using the filtration mechanism, new cooking oil can be supplied to the oil vat.

In a fryer according to a second aspect of the present invention, deteriorated cooking oil is discharged from the oil vat into the oil tank, the outflow route switching means is used to switch the outflow route of the oil pump, which is provided for oil filtration, from the oil vat to the oil disposal pipe. By driving the oil pump, deteriorated cooking oil is sucked in from the oil tank and discharged from the oil disposal pipe by way of the return pipe, which is provided to serve as a filter return duct. Thus, using the filtration mechanism, deteriorated cooking oil can be discharged from the oil vat.

In a fryer according to a third aspect of the present invention, oil can be supplied by a method similar to that of the fryer according to a first aspect of the present invention, and oil can be disposed of by a method similar to that of the fryer according to a second aspect of the present invention.

DESCRIPTION OF THE PREFERRED EMBODIMENTS

To further clarify the configuration and operation of the present invention described above, a preferred embodiment of a fryer of the present invention is described below.

Figure 1:
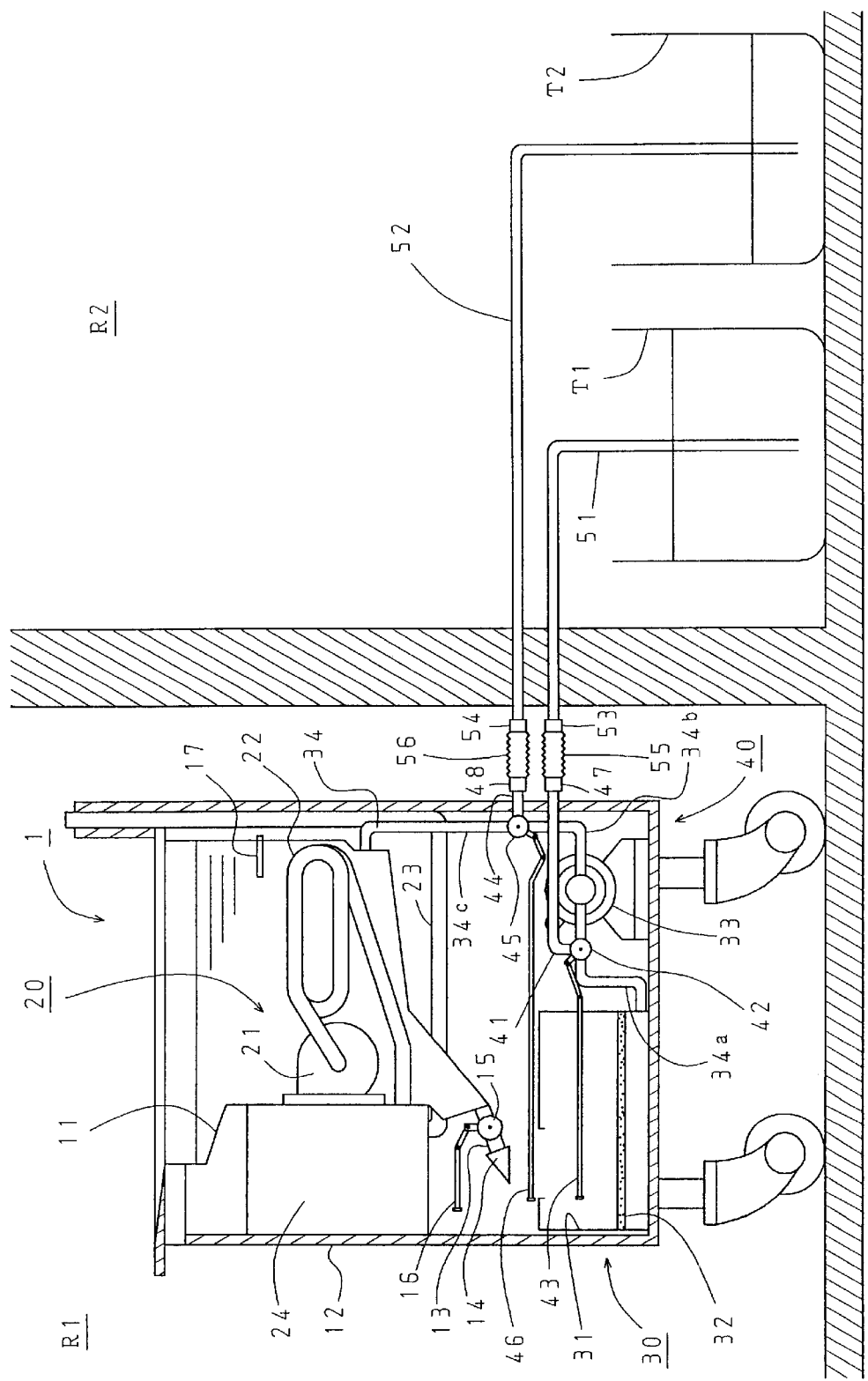
FIG. 1 is a cross-sectional view of a fryer in accordance with an embodiment of the present invention viewed from the side.

FIG. 1 shows a fryer according to an embodiment of the present invention.

Solid oil is used in the present embodiment, although after it has melted it can be handled in the same manner as liquefied oil.

A fryer 1 includes an oil vat 11 for containing oil used in deep frying foods, a pulse combustion burner 20 for heating oil within the oil vat 11, an oil cleaner 30 for filtering the oil, and an oil supply/discharge portion 40, which are contained within a casing 12.

The bottom wall of the oil vat 11 slants diagonally downward from the rear of the fryer 1 toward the front of the fryer 1. The lateral wall of the bottommost portion of that bottom wall is provided with a discharge pipe 13 for discharging oil, and a discharge opening 14 is provided at the end of the discharge pipe 13. The discharge pipe 13 is provided with a discharge valve 15, and the oil discharge valve 15 is provided with a discharge valve lever 16 for opening and closing the oil discharge valve 15.

The pulse combustion burner 20 includes a combustion/exhaust system with a combustion chamber 21, which is disposed within the oil vat 11 and is where pulse combustion takes place, a tail pipe 22 making a discharge route for the high-temperature exhaust from the combustion chamber 21, a decoupler (not shown in the drawings) provided on the downstream side of the tail pipe 22, and an exhaust pipe 23 disposed on the downstream side of the decoupler. Furthermore, a chamber 24 is disposed adjacent to the combustion chamber 21. This chamber 24 includes an air chamber, a gas chamber, and a fuel-air mixing chamber and is configured so that a mixture of fuel gas and air is supplied to the combustion chamber 21. It should be noted that, although it has no direct relation to the present invention and thus an explanation thereof has been omitted, JP H05-317191A can be referenced for a detailed description of the configuration of the pulse combustion burner 20.

The pulse combustion burner 20 is controlled by a controller (not shown in the drawings) disposed at the bottom of the front wall of the casing 12. The pulse combustion burner 20 is switched between combustion and combustion stop (that is, an on/off control is performed) by opening and closing an electromagnetic gas valve (not shown in the drawings) so that the temperature of the oil in the oil vat 11 is maintained within a certain range (for example, 180° C. to 182° C.) based on a signal from a temperature sensor 17, which is installed within the oil vat 11.

The oil cleaner 30 is made up of an oil tank 31 provided below the oil discharge opening 14, an oil filter 32 spread out in a planar shape slightly above the bottom portion of the oil tank 31, an oil pump 33 for drawing up oil that has passed through the oil filter 32 and returning that oil to the oil vat 11, and an oil pipe 34 which forms a duct for returning that oil to the oil vat 11.

Figure 2:
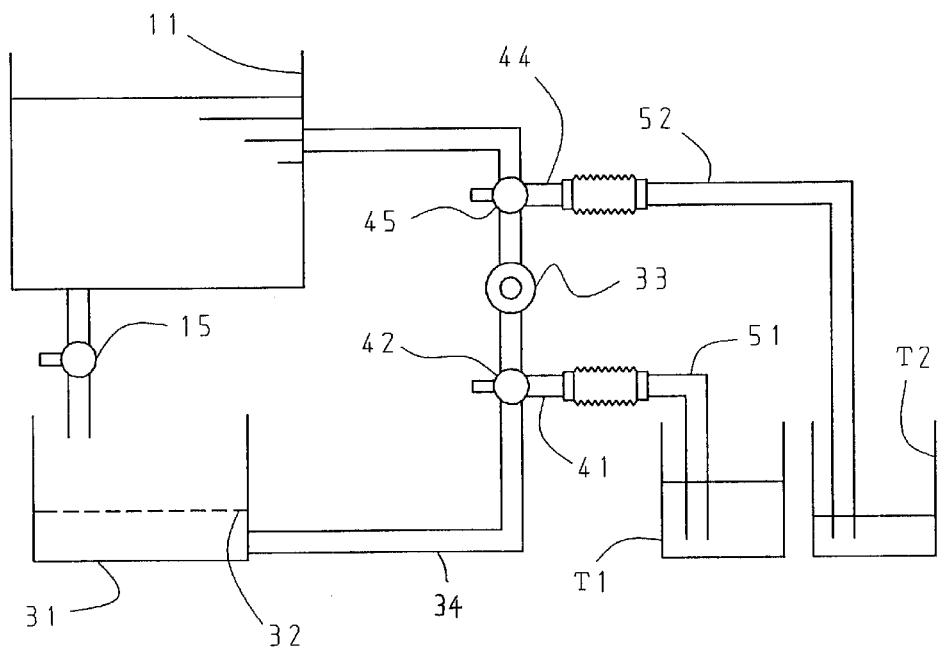
FIG. 2 illustrates the principle of a fryer in accordance with an embodiment of the present invention.

The oil supply/discharge portion 40 is described next using FIG. 1 and FIG. 2.

An oil supply pipe 41 branches off from the oil pipe 34 between the oil tank 31 and the oil pump 33, and a three-way valve oil supply valve 42 is provided at this connection portion as an intake route switching means for switching the intake route of the oil pump 33 between the oil tank 31 side and the oil supply pipe 41 side. An oil disposal pipe 44 branches off from the oil pipe 34 between the oil pump 33 and the oil vat 11, and a three-way valve oil disposal valve 45 is provided at this connected portion as an outflow route switching means for switching the outflow route of the oil pump 33 between the oil vat 11 side and the oil disposal pipe 44 side. An oil supply valve lever 43 for switching the oil supply valve 42 is attached to the oil supply valve 42 outside of the oil tank 31 and extends in a horizontal direction. An oil disposal valve lever 46 for switching the oil disposal valve 45 is provided on the oil disposal valve 45 and is parallel to the oil supply valve lever 43. Additionally, an oil supply pipe connection port 47 is provided on the end of the oil supply pipe 41, and an oil disposal pipe connection port 48 is provided on the end of the oil disposal pipe 44.

An oil storage room R2 for storing oil is located adjacent to a cooking room R1, in which the fryer 1 is used. The oil storage room R2 is provided with a supply oil storage tank T1 for holding unused oil and an oil disposal storage tank T2 for holding discarded oil. An external oil supply pipe 51 leads from the supply oil storage tank T1 to the cooking room R1 through the wall between the cooking room R1 and the oil storage room R2. An external oil supply pipe connection port 53 is provided on the end of the external oil supply pipe 51. Similarly, an external oil disposal pipe 52 leads from the oil disposal storage tank T2 to the cooking room R1 through the wall between the cooking room R1 and the oil storage room R2. An external oil disposal pipe connection port 54 is provided on the end of the external oil disposal pipe 52. Moreover, the external oil supply pipe connection port 53 is connected by a flexible oil supply pipe 55 to the oil supply pipe connection port 47 of the fryer 1, and the external oil disposal pipe connection port 54 is connected by a flexible oil disposal flexible pipe 56 to the oil disposal pipe connection port 48.

Furthermore, electric heaters (not showing in the drawings) for preventing oil from solidifying are attached to the oil pipe 34, the oil supply pipe 41, the oil disposal pipe 44, the external oil supply pipe 51, the external oil disposal pipe 52, the supply oil storage tank T1, and the oil disposal storage tank T2.

Hereafter, the portion of the oil pipe 34 extending from the oil tank 31 to the oil supply valve 42 is referred to as the "oil pipe 34$a$", the portion extending from the oil supply valve 42 to the oil disposal valve 45 is referred to as the "oil pipe 34$b$", and the portion extending from the oil disposal valve 45 to the oil vat 11 is referred to as the "oil pipe 34$c$".

With the fryer 1 described above, oil is filled into the oil vat 11, and after the oil is heated, foods are put into a basket (not shown in the drawings). This basket is submerged in the oil vat 11, and the foods are cooked by hot oil in the oil vat 11 heated by the outer wall of the combustion chamber 21 and the tail pipe 22.

As the oil in the oil vat 11 degrades when continually used, it is necessary to periodically filter the oil with the oil cleaner 30. To filter the oil in the oil vat 11, first the discharge valve lever 16 is operated to open the discharge valve 15 to let oil fall into the oil tank 31. After the discharge valve 15 is closed, the oil supply valve lever 43 is operated and the oil supply valve 42 is switched so that the oil pipe 34a and the oil pipe 34b are in a state of communication. Then the oil disposal valve lever 46 is operated and the oil disposal valve 45 is switched so that the oil pipe 34b and the oil pipe 34c are in a state of communication. Under this condition, oil that has passed through the oil filter 32 is returned to the oil vat 11 by driving the oil pump 33.

As there is a limit to the reuse of oil by filtering like this, when oil has degraded beyond a certain level, it should be discarded. In that case, the discharge valve lever 16 is operated to open the discharge valve 15, and deteriorated oil falls into the oil tank 31 after passing from the oil vat 11 through the oil discharge opening 14. Next, the oil supply valve lever 43 is operated and the oil supply valve 42 is switched so that the oil pipe 34a and the oil pipe 34b are in a state of communication. Then the oil disposal valve lever 46 is operated and the oil disposal valve 45 is switched so that the oil pipe 34b and the oil disposal pipe 44 are in a state of communication. Under this condition, by driving the oil pump 33, oil is discharged from the oil tank 31 into the oil disposal storage tank T2. It should be noted that it is unnecessary to filter the oil at this time, so it is also possible to remove the oil filter 32.

Next, oil is supplied into the empty oil vat 11. In this case, first the discharge valve lever 16 is operated to close the discharge valve 15. Then, the oil disposal valve lever 46 is operated and the oil disposal valve 45 is switched so that the oil pipe 34b and the oil pipe 34c are in a state of communication. Then the oil supply valve lever 43 is operated and the oil supply valve 42 is switched to put the oil supply pipe 41 and the oil pipe 34b in a state of communication. By driving the oil pump 33, oil that has been liquefied in the supply oil storage tank T1 by the electric heater is supplied to the oil vat 11.

Moreover, oil in the oil vat 11 is depleted because of absorption by foods and evaporation through heating, so it may be necessary to supplement oil while the fryer 1 is in use. This can be carried out in the same way as in the above-described method of supplying oil.

An embodiment of the present invention has been described above, yet the present invention is in no way limited to this embodiment, and it is of course possible to perform a variety of embodiments within a scope that does not deviate from the essential points of the present invention.

Figure 3:
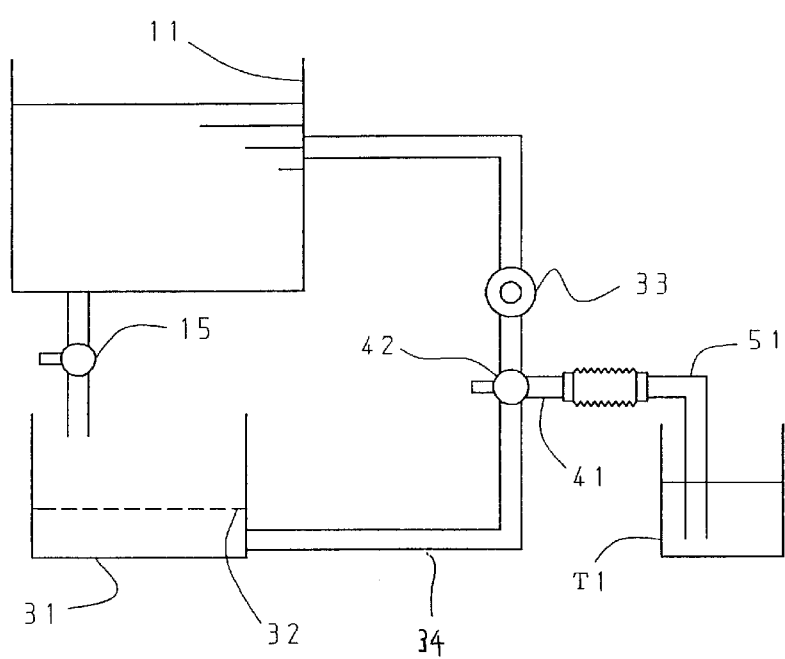
FIG. 3 illustrates the principle of a fryer according to claim 1.

For example, as shown in FIG. 3 (diagram illustrating the operation principle), it is also possible to remove the oil disposal mechanism from the fryer according to the present embodiment.

Figure 4:
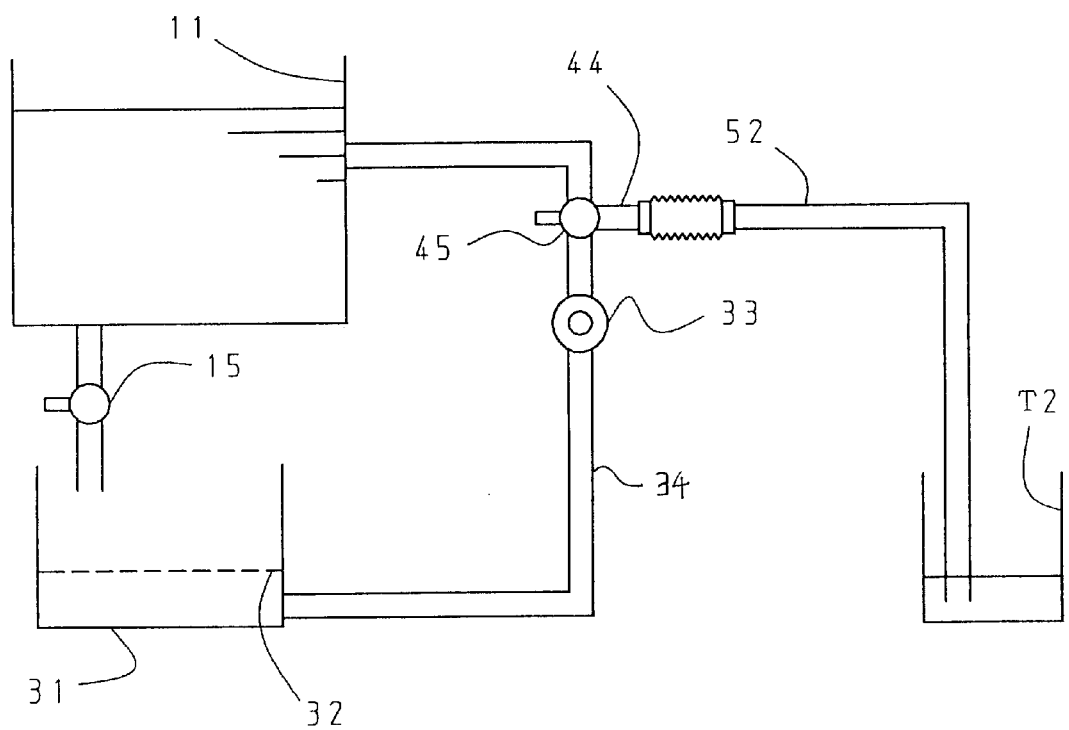
FIG. 4 illustrates the principle of a fryer according to claim 2.
Figure 5:
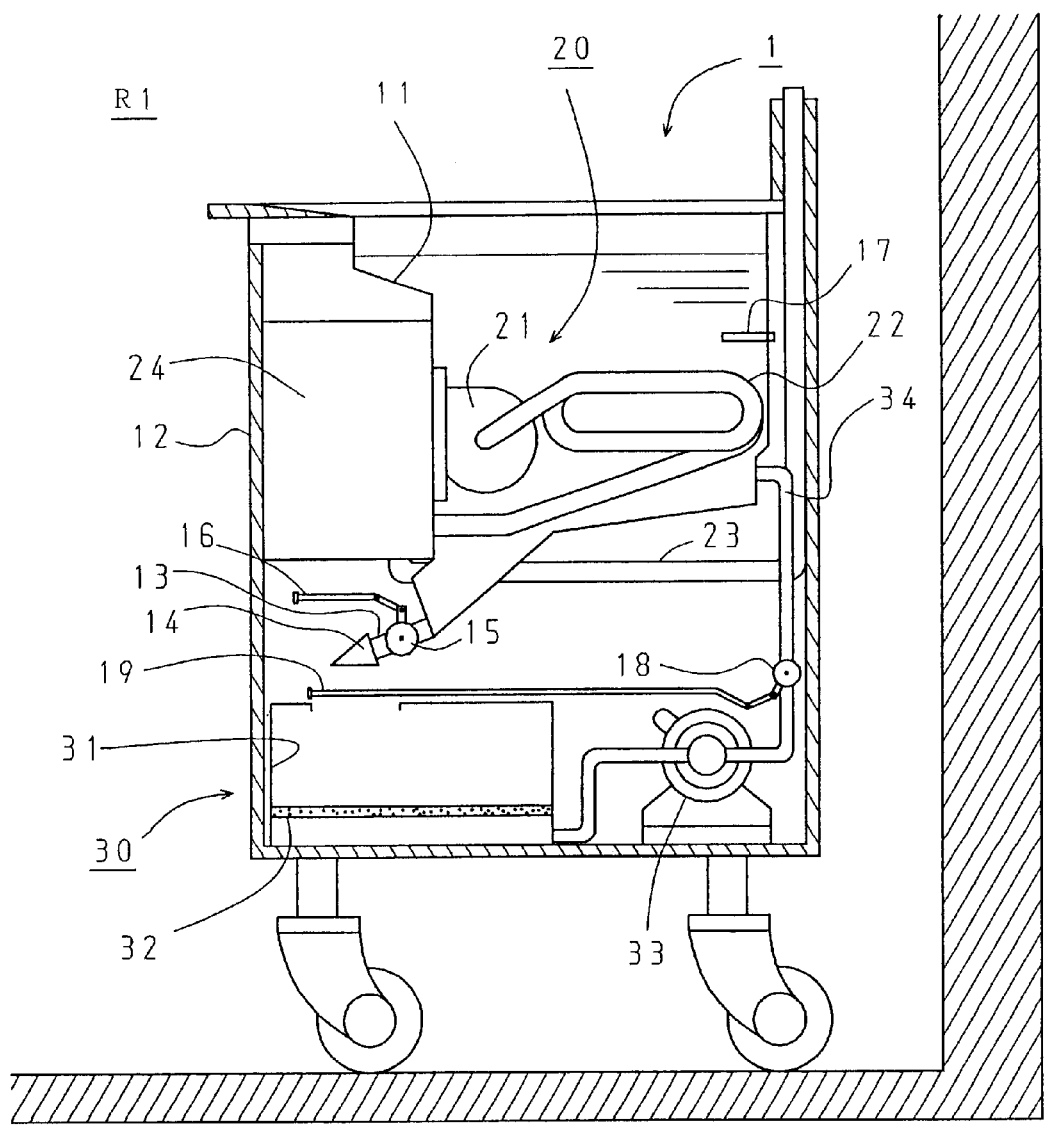
FIG. 5 is a cross-sectional view of a conventional fryer viewed from the side.

Alternatively, as shown in FIG. 4 (diagram illustrating the operation principle), it is also possible to remove the oil supply mechanism from the fryer according to the present embodiment.

Moreover, in the present embodiment, a fryer of the pulse combustion type was given as an example, but it is of course also possible to use a fryer wherein the oil vat is heated from the outside by a ceramic plate burner, and no limitations are placed on the type of the heating arrangement.

Further, solid-state oil does not have to be used necessarily, and liquid oil such as vegetable oil can be used instead, in which case the electric heaters for preventing the oil from solidifying become unnecessary.

Furthermore, it is also possible to attach a means that can recognize the open/close position of a valve, such as a micro switch, to the oil supply valve and the oil disposal valve. Linking that means with the oil pump prevents the oil pump from being turned on depending on the relation between the open/close positions of the valves. In that case, it is possible to prevent mishaps caused by wrong operation of the valves, such as discharging unused oil into the oil discharge storage tank.

As described in detail above, according to a fryer of the first aspect of the present invention, an oil pump and a return pipe used in the filtering mechanism are used to perform the task of supplying oil. Thus, the fryer operator does not need to carry the oil all the way to the fryer, and the task of supplying oil to the fryer is simplified. In particular, when solid oil is used as the cooking oil, the need to directly handle hot liquefied oil is eliminated, and thus the oil supply operation becomes safer. The result of these features is that the operator's time that has been taken up by those tasks can be allocated to other tasks, and work can be performed more efficiently.

Moreover, according to a fryer of the second aspect of the present invention, the oil pump and return pipe used in the filtering mechanism can be used to perform the task of disposing oil. Thus, the fryer operator does not need to carry oil all the way from the fryer, and the task of discarding oil is simplified. Furthermore, the need to directly handle hot discarded oil is eliminated, and thus the oil discarding operation becomes safer. The result of these features is that the operator's time that has been taken up by those tasks can be allocated to other tasks, and work can be performed more efficiently.

Further, according to a fryer of the third aspect of the present invention, the oil pump and return pipe used in the filtering mechanism can be used to perform the tasks of supplying oil and disposing oil. Therefore, the fryer operator does not need to carry oil all the way to or from the fryer, and the work is performed without directly handling the hot oil, thus, making the task of supplying and disposing oil be simple and safe. The result of these features is that the operator's time that has been taken up by those tasks can be allocated to other tasks, and work can be performed more efficiently.

What is claimed is:

1. A fryer comprising an oil vat for containing cooking oil; a heating means for heating the cooking oil in the oil vat; a filtering device for filtering the cooking oil in the oil vat when it is discharged into an oil tank; a return pipe serving as a duct for returning cooking oil in the filtering device to the oil vat; and an oil pump, disposed at an intermediate portion in the return pipe, for intaking cooking oil in the oil tank and pumping it to the oil vat, wherein, on the intake side of the oil pump, an oil supply pipe branches off from the return pipe, and an intake route switching means is provided for switching an intake route of the oil pump between the filtering device and the oil supply pipe.

2. A fryer comprising an oil vat for containing cooking oil; a heating means for heating the cooking oil in the oil vat; a filtering device for filtering the cooking oil in the oil vat when it is discharged into an oil tank; a return pipe serving as a duct for returning cooking oil in the filtering device to the oil vat; and an oil pump, disposed at an intermediate portion in the return pipe, for intaking cooking oil in the oil tank and pumping it to the oil vat, wherein, on the outflow side of the oil pump, an oil disposal pipe branches off from the return pipe, and an outflow route switching means is provided for switching the outflow route of the oil pump between the oil vat and the oil disposal pipe.

3. A fryer comprising an oil vat for containing cooking oil; a heating means for heating the cooking oil in the oil vat; a filtering device for filtering the cooking oil in the oil vat when it is discharged into an oil tank; a return pipe serving as a duct for returning cooking oil in the filtering device to the oil vat; and an oil pump, disposed at an intermediate portion in the return pipe, for intaking cooking oil in the oil tank and pumping it to the oil vat, wherein, on the intake side of the oil pump, an oil supply pipe branches off from the return pipe, and on the outflow side of the oil pump, an oil disposal pipe branches off from the return pipe; and wherein the fryer further comprises an intake route switching means for switching the intake route of the oil pump between the filtering device and the oil supply pipe, and an outflow route switching means for switching the outflow route of the oil pump between the oil vat and the oil disposal pipe.

* * * * *